United States Patent Office 3,780,144
Patented Dec. 18, 1973

3,780,144
HALOGENATED ETHYLENICALLY UNSATU-
RATED PHOSPHATES
Gaetano F. D'Alelio, 2011 E. Cedar St.,
South Bend, Ind. 46617
No Drawing. Continuation of abandoned application Ser.
No. 785,335, Dec. 19, 1968. This application Sept. 10,
1971, Ser. No. 179,543
Int. Cl. A01n 9/36; C07f 9/08; C08f 45/58
U.S. Cl. 260—956        13 Claims

ABSTRACT OF THE DISCLOSURE

This invention deals with new phosphorus-containing esters having the formulas

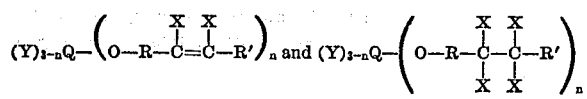

wherein
$n$ is an integer having a value of 1 to 3,
Q is P or PO,
R is a divalent hydrocarbon having at least one and no more than 10 carbon atoms,
X is chlorine or bromine,
R' is X or R'',
R'' is hydrogen or a monovalent hydrocarbon having at least one and no more than 20 carbon atoms, and
Y is X, OR'' or NR''$_2$.

These new esters are useful particularly as fire retardants, agricultural chemicals, fuel additives, plasticizers, monomers and intermediates for the synthesis or other useful derivatives.

---

This is a continuation of application Ser. No. 785,335, filed Dec. 19, 1968, now abandoned.

RELATED PRIOR ART

No pertinent prior art is known. Some of the intermediate acetylenic phosphorus-containing esters which can be halogenated to some of the products of this invention are disclosed in my copending application, Ser. No. 692,-638, filed Dec. 22, 1967, now abandoned.

BACKGROUND OF THE INVENTION

This invention involves new esters containing both phosphorus and halogen atoms in their structures. In general, it concerns the phosphite and phosphonium esters of halogenated ethylenic alcohols. In particular, it deals with esters whose formula may be written as $$(Y)_{3-n}Q\text{-}(Z)_n$$

wherein $n$ has a numerical value of at least one and no more than three. Thus when $n$ equals three, there is no Y. The symbol Q represents the trivalent moieties,

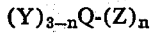

Z represents the alkoxy moiety,

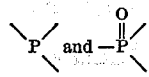

derived from the halogenated ethylenic alcohols of the structure

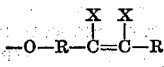

wherein X is chlorine or bromine, R is a divalent hydrocarbon radical having at least one and no more than 10 carbon atoms, R' is X or R'', R'' is hydrogen or a hydrocarbon radical containing at least one and no more than 20 carbon atoms, and Y is X, OR' or NR'$_2$. The formula of the compounds of this invention may be written also as

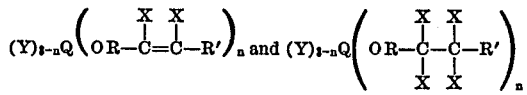

These compounds are readily prepared from the reaction of the haloethylenic alcohols and the corresponding phosphorus halides, in the temperature range of 0 to 100° C.,

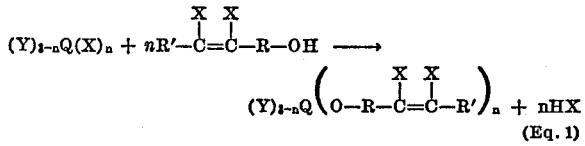

(Eq. 1)

Specific examples of these reactions are:

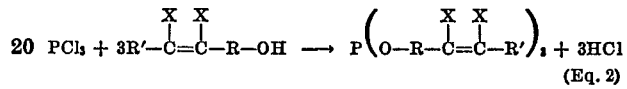

(Eq. 2)

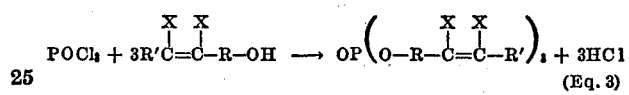

(Eq. 3)

The esters of this invention differ from the esters of halogenated saturated alcohols, for example, $$P(OCH_2CHXCH_2X)_3$$

and $$OP(OCH_2)CHXCH_2X)_3$$

in the hydrolytic stability of the halogen atoms. This stability is inherent in the structures originally present in the respective alcohols,

and R'CHXCHX—R—OH. For example, $$ClCH=CClCH_2OH$$

can be refluxed with a large excess of water even in the presence of sodium carbonate and the halogenated ethylenic alcohol recovered unchanged, whereas all or a greater portion of the halogen is lost when $$ClCH_2CHClCH_2OH$$

is treated under similar conditions. This loss of halogen also occurs under conditions of high humidity, thereby destroying the practical utility of the compound and releasing corrosively destructive hydrogen chloride.

The difference in the hydrolytic stability of the halogen atoms in these two different types of alcohols is maintained even when the alcohols are converted to esters by such acids as the carboxylic, phosphorous and phosphoric acids. The halogenated acetylenic alcohols used in the practice of this invention are readily available by the facile halogenation of available or easily prepared acetylenic alcohols, $$R'C\equiv CR\text{—}OH+X_2\rightarrow R'CX=CX\text{—}R\text{—}OH$$

specific examples of which are $$HC\equiv C=CH_2OH+Br_2\rightarrow BrCH=CBrCH_2OH$$

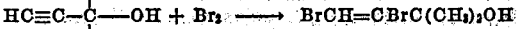

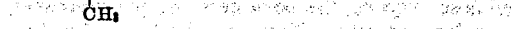

In some cases the halogenated ethylenic alcohols can be prepared from the available 1,2,3-trihaloalkenes, as for example, by the hydrolysis of 1,2,3-trichloropropene:

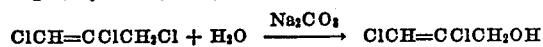

$$ClCH=CClCH_2Cl + H_2O \xrightarrow{Na_2CO_3} ClCH=CClCH_2OH$$

Instead of using the halogenated ethylenic alcohols with the phosphorus halides as shown in Equation 1, the acetylenic alcohol may be converted first to the ester and the acetylenic ester postbrominated, to the desired product, thus $$(Y)_{3-n}Q(X)_n + nR''-C\equiv C-R-OH \longrightarrow$$

$$(Y)_{3-n}Q(O-R-C\equiv C-R'')_n + nHX \xrightarrow{nX_2}$$

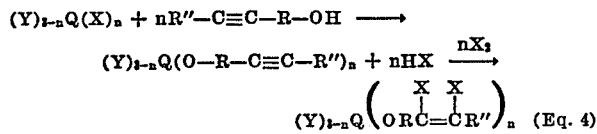

(Eq. 4)

A specific example of this is $$PCl_3 + 3CH\equiv CCH_2OH \longrightarrow P(OCH_2C\equiv CCH)_3 \xrightarrow{3Br_2}$$

$$P(OCH_2CBr=CBr)_3 \quad (Eq. 5)$$

Also, instead of the POCl$_3$, which is used in Equation 3 to produce $(Y)_{3-n}PO(X)_n$, there may be used PCl$_5$ or derivatives thereof, and the reaction product obtained hydrolyzed with water to yield the phosphate ester, thus

$$PCl_5 + nR''-C=C-R-OH \longrightarrow$$

$$Cl_3P(O-CR=C-R'')_n \xrightarrow{H_2O} OP(O-R-C=C-R'')_n \quad (Eq. 6)$$

For example:

$$PCl_5 + 3HOCH_2C=CH \longrightarrow Cl_3P(OCH_2C=CH)_3 \xrightarrow{H_2O}$$

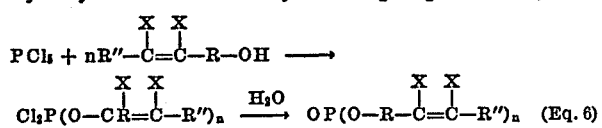

(Eq. 7)

The ester exchange reaction can also be used to prepare the products of this invention, thus $$Q(OR'')_3 + nHO-R-C=C-R'' \longrightarrow$$

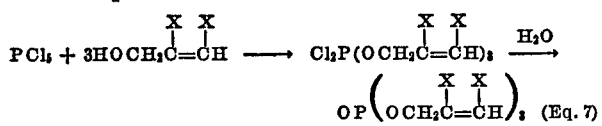

for example $$P(OCH_3)_3 + 3HOCH_2C=CH \longrightarrow$$

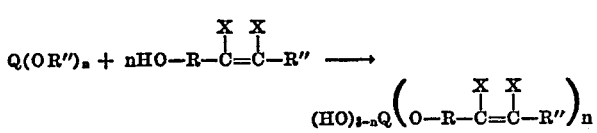
$+ 3 CH_3OH$ $$P(OCH_3)_3 + 2HOCH_2C=CH \longrightarrow$$

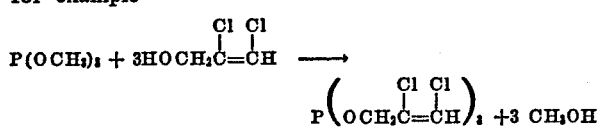
$+ 2CH_3OH$ $$P(OC_2H_5)_3 + HOCH_2C=CH \longrightarrow$$

$$(H_5C_2O)_2POCH_2C=CH + C_2H_5OH$$

$$OP(OCH_3)_3 + 3HOCH_2C=C-CH_3 \longrightarrow$$

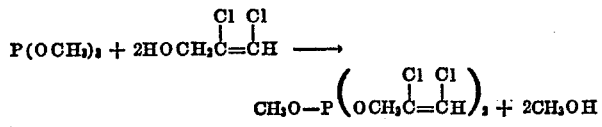
$+ 3CH_3OH$

The novel phosphorus containing esters of this invention are self-extinguishing when ignited and thus are particularly useful as fire-retardant additives for a host of other materials and compounds, particularly those of a resinous or polymeric nature, for example, when added to polymethyl methacrylate, polystyrene, cellulose acetate, cellulose butyrate, the polyesters, the polyurethanes, rubbers, nylon and others. They can also be used as fire-retardant impregnants for porous bodies, such as paper, wood, fiberboard, cork, etc.

As organic compounds containing phosphorus and halogen atoms they are useful also as agricultural chemicals in the fields of insecticides, herbicides, pesticides, etc., as well as gasoline additives to function as metals scavengers for anti-knock gasolines containing organo-lead, -boron or other metallo-organo-compounds. Particularly are they useful as chemical intermediates in the synthesis of a host of other useful derivatives. For example, they can be halogenated further at the ethylenic double bond to produce tetrahalo compounds which have even greater self-extinguishing properties than the dihalo compounds. They are also readily convertible to the mono- and dibasic phosphorus esters. The mono-basic phophorus esters, HOP(Z)$_2$, readily undergo the Mannich reaction with formaldehyde and secondary amines. They also add to olefinic double bonds of the unsaturated compounds to yield plasticizers as well as polymerizable monomers. They react with epoxy compounds to produce substituted alcohols which can be used as modifiers of urethane polymers, polyesters, cellulose, etc.

The phosphite esters of this invention undergo the Arbizov recation with organic compounds containing a terminal

group to yield new derivatives containing the carbon phosphorus bonds; and when reacted with carbon tetrachloride, the resulting trichloromethyl phosphorus compound is readily converted to the phosphonamide. Derivatives prepared from the compounds of this invention also find utility as flame-retardant additives and impregnants, as agricultural chemicals and as fuel additives. In addition, when the parent compounds or derivatives contain functional groups, such as the OH groups, they can be used as modifiers in polymerization reactions or can be reacted with other functional molecules such as with the isocyanates, acid anhydrides, acid chlorides, oxirane compounds, etc., or when they contain an unsaturated olefinic group they can be homopolymerized or copolymerized with other monomers; or when they contain an amide group they can be reacted with aldehydes and polymerized alone or copolymerized with urea or melamine, or their methylol compounds can be reacted with cellulose or wool, etc.

The practice of this invention is illustrated by the following examples. These examples are given merely by way of illustration and are not intended to limit the scope of the invention in any way nor the manner in which the invention can be practiced. Unless specificially indicated otherwise, parts and percentages are given as parts and percentages by weight.

Example I

One hundred forty-five parts (145) of 1,2,3-trichloropropene are added to a solution of 106 parts of sodium carbonate dissolved in 900 parts of water and the mixture refluxed for ten hours. The water layer is then separated from the oily layer which is dried over anhydrous sodium carbonate, separated by filtration and distilled. There is obtained 115 parts of 2,3-dichloro-2-propene-1-ol, ClCH—CClCH$_2$OH (I), B.P. 45–46° C./1.5 mm.; yield 91%.

Example II (a) To 250 parts of carbon tetrachloride is added 56 parts of propargyl alcohol (A) and to this solution there is added slowly, at room temperature, a solution of 160 parts of bromine in 250 parts of carbon tetrachloride and allowed to react at room temperature for two hours. Then the mixture is heated to 30–40° C. for two hours. The product is distilled to recover the carbon tetrachloride and the 2,3-dibromo-2-propene-1-ol, BrCH—CBrCH$_2$OH (II), B.P. 51–52° C./0.7 mm.; yield 93%.

(b) Treatment of 1,2,3-tribromopropene with aqueous sodium carbonate by the procedure of Example I yields the same 2,3-dibromo-2-propene-1-ol.

Example III

The reaction of 2-methyl-3-butyn-2-ol (B) with NaCCl under an inert atmosphere of nitrogen according to the procedure given in the Bull. Soc. Chim. (France), p. 1615 (1965) gives an 87% yield of 4-chloro-2-methyl-3-butyl-2-ol,

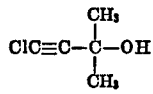

B.P. 54–56° C./18 mm.

Example IV

The reaction of 2-methyl-3-butyl-2-ol in water with $Br_2$ and NaOH by the procedure given in Ann. Chem. (Rome), 47, 118 (1957) yields 4-bromo-2-methyl-3-butyn-2-ol,

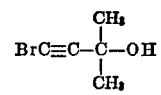

(IV) B.P. 92–93° C./22 mm.

Example V

The procedure of Example II(a) is repeated using instead of propargyl alcohol, one equivalent weight of the following acetylenic alcohols to obtain the halo-derivative corresponding to the alcohol used:

| Acetylenic alcohol | | Dibromoethylene derivative | |
|---|---|---|---|
| $HC{\equiv}C-CH(CH_3)-OH$ | (C) | $HC{=}CBr-CH(CH_3)-OH$ with Br | (V) |
| $HC{\equiv}C-CH(C_2H_5)-OH$ | (D) | $HC{=}CBr-CH(C_2H_5)-OH$ with Br | (VI) |
| $HC{\equiv}C-CH(C_3H_7)-OH$ | (E) | $HC{=}CBr-CH(C_3H_7)-OH$ with Br | (VII) |
| $HC{\equiv}C-CH(C_4H_9)-OH$ | (F) | $HC{=}CBr-CH(C_4H_9)-OH$ with Br | (VIII) |
| $HC{\equiv}C-CH(C_8H_{17})-OH$ | (G) | $HC{=}CBr-CH(C_8H_{17})-OH$ with Br | (IX) |
| $HC{\equiv}C-CH(C_6H_5)-OH$ | (R) | $HC{=}CBr-CH(C_6H_5)-OH$ with Br | (X) |
| $HC{\equiv}C-C(CH_3)_2-OH$ | (B) | $HC{=}CBr-C(CH_3)_2-OH$ with Br | (XI) |
| $HC{\equiv}C-C(CH_3)(C_2H_5)-OH$ | (I) | $HC{=}CBr-C(CH_3)(C_2H_5)-OH$ with Br | (XII) |
| $HC{\equiv}C-C(CH_3)(C_4H_9)-OH$ | (J) | $HC{=}CBr-C(CH_3)(C_4H_9)-OH$ with Br | (XIII) |
| $HC{\equiv}C-C(C_4H_9)_2-OH$ | (K) | $HC{=}CBr-C(C_4H_9)_2-OH$ with Br | (XIV) |
| $H_3C-C{\equiv}C-CH_2OH$ | (L) | $CH_3CBr{=}CBr-CH_2OH$ | (XV) |
| $H_3C-C{\equiv}C-CH_2CH_2OH$ | (M) | $CH_3CBr{=}CBr-CH_2CH_2OH$ | (XVI) |
| $C_6H_5C{\equiv}C-(CH_2)_{10}OH$ | (N) | $C_6H_5CBr{=}CBr-(CH_2)_{10}OH$ | (XVII) |
| $H_{41}C_{20}C{\equiv}C-CH_2OH$ | (O) | $H_{41}C_{20}CBr{=}CBr-CH_2OH$ | (XVIII) |
| $H_3CC{\equiv}C-CH_2CH(CH_3)-OH$ | (P) | $H_3CCBr{=}CBr-CH_2CH(CH_3)-OH$ | (XIX) |
| $C_4H_9C{\equiv}C-CH_2OH$ | (Q) | $H_9C_4CBr{=}CBr-CH_2OH$ | (XX) |
| $C_6H_5C{\equiv}C-CH_2OH$ | (R) | $C_6H_5CBr{=}CBr-CH_2OH$ | (XXI) |
| $C_6H_5C{\equiv}C-CH_2CH_2OH$ | (S) | $C_6H_5CBr{=}CBr-CH_2CH_2OH$ | (XXII) |
| $C_6H_{11}C{\equiv}C-CH_2OH$ | (T) | $C_6H_{11}CBr{=}CBr-CH_2OH$ | (XXIII) |

TABLE—Continued

| Acetylenic alcohol | | Dibromoethylene derivative | |
|---|---|---|---|
| $C_6H_5C{\equiv}C-\underset{\underset{CH_3}{\|}}{CH}-OH$ | (U) | $C_6H_5\underset{\underset{}{\|}}{\overset{\overset{Br}{\|}}{C}}=\underset{\underset{}{\|}}{\overset{\overset{Br}{\|}}{C}}-\underset{\underset{CH_3}{\|}}{CH}-OH$ | (XXIV) |
| $C_6H_5C{\equiv}C-\underset{\underset{CH_3}{\|}}{\overset{\overset{CH_3}{\|}}{C}}-OH$ | (V) | $C_6H_5\overset{\overset{Br}{\|}}{C}=\underset{\underset{CH_3}{\|}}{\overset{\overset{Br}{\|}}{C}}-\underset{\underset{CH_3}{\|}}{\overset{\overset{CH_3}{\|}}{C}}-OH$ | (XXV) |
| $ClC{\equiv}C-\underset{\underset{CH_3}{\|}}{\overset{\overset{CH_3}{\|}}{C}}-OH$ | (III) | $Cl\overset{\overset{Br}{\|}}{C}=\underset{\underset{CH_3}{\|}}{\overset{\overset{Br}{\|}}{C}}-\underset{\underset{CH_3}{\|}}{\overset{\overset{CH_3}{\|}}{C}}-OH$ | (XXVI) |
| $BrC{\equiv}C-\underset{\underset{CH_3}{\|}}{\overset{\overset{CH_3}{\|}}{C}}-OH$ | (IV) | $Br\overset{\overset{Br}{\|}}{C}=\underset{\underset{CH_3}{\|}}{\overset{\overset{Br}{\|}}{C}}-\underset{\underset{CH_3}{\|}}{\overset{\overset{CH_3}{\|}}{C}}-OH$ | (XXVII) |
| $C_{10}H_7C{\equiv}CCH_2OH$ | (W) | $C_{10}H_7\overset{\overset{Br}{\|}}{C}=\overset{\overset{Br}{\|}}{C}-CH_2OH$ | (XXVIII) |

Example VI (a) To a solution of 56 parts of propargyl alcohol and 0.1 part of iodine in 300 parts of tetrachloroethylene is slowly passed chlorine gas while exposed to an ultraviolet lamp until 70 parts of chlorine are reacted. The halogenated product is then recovered by distillation and the majority of the product is identical to the 2,3-dichloro-2-propene-1-ol of Example I.

(b) In a similar manner there is prepared

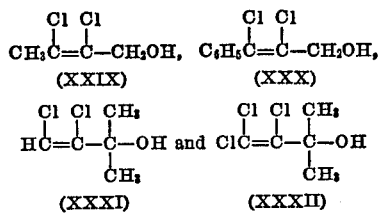

Example VII

A mixture of 46 parts of PCl₃, 126 parts of 2,3-dichloro-2-propene-1-ol and 150 parts of toluene are refluxed until no more HCl is evolved from the reaction. The mixture is then allowed to cool to room temperature; then 5 parts of anhydrous sodium carbonate and 3 parts of decolorizing carbon are added to the solution and allowed to stand with stirring for 8 to 24 hours. The solution is then filtered and the filtrate distilled at 0.5 to 14 mm. Hg pressure to recover the toluene. The yield of almost colorless residue is 96% of the theoretical amount. The infrared spectra of the product confirm the absence of the band for the —OH group of the alcohol and the presence of the band for the ester group. The product is a viscous oil insoluble in water but soluble in benzene and toluene. The elemental analysis of the product: percent C, 26.95; percent H, 2.24; percent Cl, 52.26; are in close agreement with the theoretical values of C, 26.42; H, 2.20; Cl, 52.02 for P(OCH₂CCl=CHCl)₃. The boiling point of the product is higher than 120° C. at 0.5 mm. Hg. Attempts to distill the product at higher pressures, or at higher temperature at 0.5 mm. pressure results in secondary reactions which change the nature of the product, which product, however, is still self-extinguishing.

Example VIII

The procedure of Example VII is repeated using 51 parts of POCl₃ instead of 46 parts of PCl₃ and there is obtained the ester, PO(OCH₂CCl=CHCl)₃, which contains approximately 50% chlorine. The reaction with POCl₃ is much slower than with PCl₃; however, it proceeds very readily if a mole of an hydrogen chloride acceptor, such as triethyl amine or pyridine, is used in the reaction mixture for each mole of liberated hydrogen chloride.

Example IX

The procedure of Example VII is repeated 16 times using instead of 2,3-dichloro-2-propene-1-oil an equivalent mole weight (in parts) of the dihaloethylenic alcohols, II, V, VII, IX, XVII, XIX, XVI, XXVI, XXVIII, XXIX, XXX, XXXI and XXXI, and the corresponding triesters of the formula

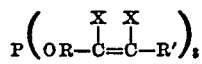

are obtained.

Example X

The procedure of Example VIII is repeated using instead of 2,3-dichloro-2-propene-1-ol, the acetylenic alcohols VIII, XI, XV, XVIII, XXI and XXII, and triethylamine as the hydrohalide acceptor, and the corresponding triesters of the formula

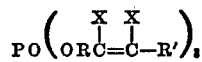

are obtained.

Example XI

The procedure of Example VII is repeated 16 times using instead of 2,3-dichloro-2-propene-1-oil an equivalent weight of the acetylenic alcohols, X, XII, XIII, XIV, XX, XXII, XXIII, XXIV and XXV, and the esters corresponding to the formula

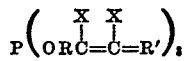

are obtained.

Example XII (a) The phosphite ester,

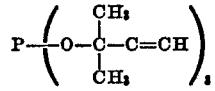

is prepared from PCl₃ and

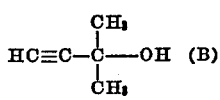

by the procedure given in U.S. Pat. 2,278,791, Dec. 27, 1955, and converted by the procedure of Example II(a) by reaction with Br₂ to

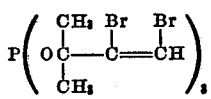

(b) In a manner similar to the procedure of XII(a) the acetylenic alcohols III, IV, C, D, L and M are converted to the phosphite esters, P(ORC≡CR")$_3$, and by post bromination to esters corresponding to the formula

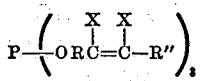

(c) Posthalogenation by the procedure of Example XII(a), using two moles of Br$_2$ instead of one mole of Br$_2$ per acetylenic triple bond of the esters of Examples XII(a) and (b) yields the tetraholethane derivatives,

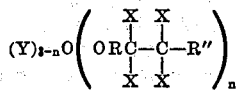

instead of the dihalo direvatives

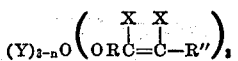

Example XIII

A mixture of 40.6 parts of P(OCH$_2$CCl=CHCl)$_3$ and 8.2 parts of P(OH)$_3$ are heated at 75° C. for three hours and there is obtained the viscous product comprising as the major product 48.8 parts of HOP(OCH$_2$CCl=CHCl)$_2$

Example XIV

The procedure of Example XIII is used to react a mixture of 40.6 parts of P(OCH$_2$CCl=CHCl)$_3$ and 16.4 parts of P(OH)$_3$ to obtain a viscous mixture containing 57 parts of (HO)$_2$P(OCH$_2$CCl=CHCl) as the major product.

Example XV

A mixture of 10.15 parts of P(OCH$_2$CCl=CHCl)$_3$ and 15 parts of CH$_3$COOH are heated at 100° C. for 2 hours following which it is distilled at 15 mm. pressure to recover 42 parts of CH$_3$COOCH$_2$CCl=CHCl, leaving as a residue 86.2 parts of HOP(OCH$_2$CCl=CHCl)$_2$ which on analysis is shown to contain 46.4% of Cl compared to a theoretical value of 47.3.

Example XVI (a) A mixture of 21.3 parts of (C$_4$H$_9$O)$_2$PCl and 12.6 parts of HOCH$_2$CCl=CHCl are reacted by the procedure of Example VII and there is obtained 30 parts of (C$_4$H$_9$O)$_2$P(OCH$_2$CCl—CHCl)

(b) A mixture of 12.1 parts of (CH$_2$=CHCH$_2$O)$_2$PCl and 12.6 parts of HOCH$_2$CCl=CHCl are reacted by the procedure of Example VII and there is obtained (H$_2$C=CHCH$_2$O)$_2$P(OCH$_2$CCl=CHCl)

which, on postbromination by the procedure of Example II(a) yields (BrH$_2$CCHBrCH$_2$O)$_2$P(OCH$_2$CCl=CHCl).

Example XVII (a) To a stirred mixture of 30 parts of

HOP(OCH$_2$CCl=CHCl)$_2$ and 14.4 parts of dimethyl maleate at 0–5° C. is added 1 part of triethylamine and the mixture allowed to react for 4 hours. Then the temperature of the mixture is allowed to rise to 20° C. and is maintained at this point for 2 hours, following which it is heated at 35° C. for 3 hours and there is obtained 44 parts of

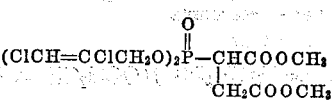

(b) Substitution in the above procedure of equivalent amounts of diallyl fumarate and ethyl acrylate for the dimethyl maleate yield the compounds

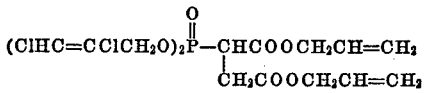

and

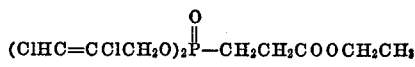

respectively.

Example XVIII

To each of five samples of 20.4 parts of

HOP(OCH$_2$CCl=CHCl)$_2$ respectively there is added slowly with stirring the indicated amount of individual epoxy compounds and in each case the mixture is allowed to react at 50–60° C. There are obtained the following hydroxyalkyl derivatives respectively:

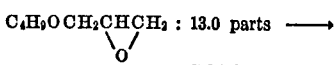

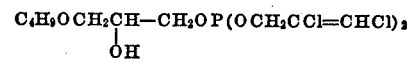

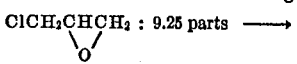

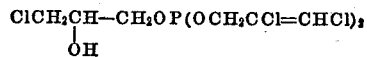

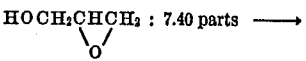

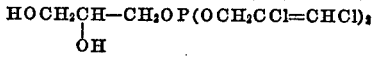

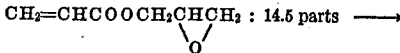

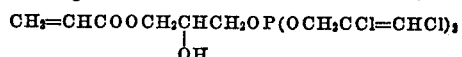

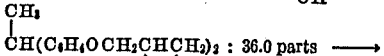

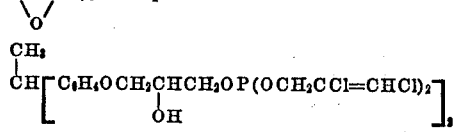

Example XIX

To respective mixtures of 40.8 parts of

HOP(OCH$_2$CCl=CHCl)$_2$ 6.0 parts of paraformaldehyde, (CH$_2$O)$_x$ and 50 parts of tetrahydrofuran, there are added slowly, with stirring, one equivalent respectively of the following compounds, and the mixture in each case is allowed to react at 40–75° C., after which the tetrahydrofuran is removed by distillation at 100 mm. pressure. The following methylene derivatives are obtained:

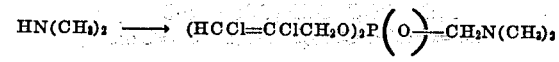

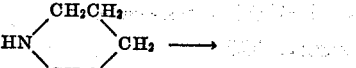

CH$_3$NHCH$_2$CH$_2$OH ⟶

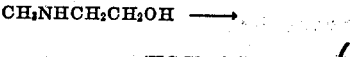

HN(CH$_2$CH$_2$OH)$_2$ ⟶

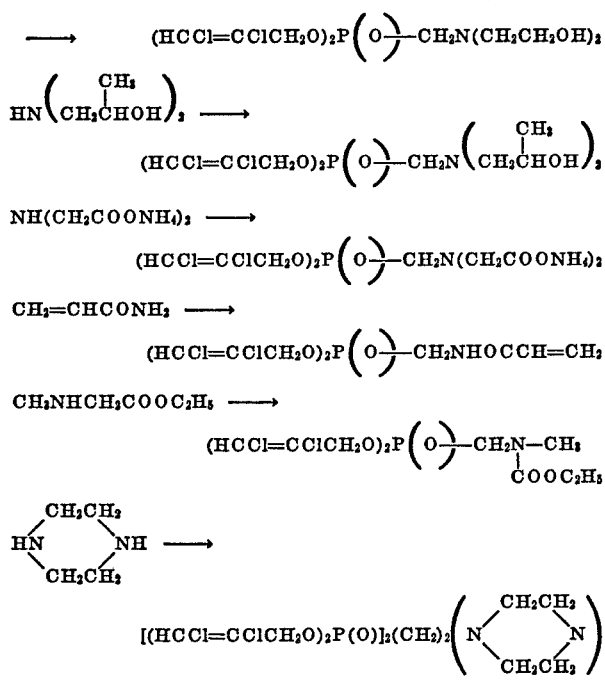

Example XX (a) An equimolar mixture of P(OCH₂CCl=CHCl)₃ and CCl₄ are heated at 100° C. for 3 hours, following which the mixture is distilled to recover ClCH=CClCH₂Cl leaving as a residue, the product Cl₃CP(OCH₂CCl=CHCl)₂

(b) The addition of a mole weight of ammonia, methylamine, ethanolamine, diethanolamine and aniline to each of a mole of the above trichloromethyl ester derivative liberates one mole of chloroform, CHCl₃ and H₂NP(OCH₂CCl=CHCl)₂

H₃CHNP(OCH₂CCl=CHCl)₂

HOCH₂CH₂NHP(OCH₂CCl=CHCl)₂

(HOCH₂CH₂)₂NP(OCH₂CCl=CHCl)₂ and C₆H₅NHP(OCH₂CCl=CHCl)₂ respectively. The identical products are obtained if one mole of P(OCH₂CCl=CHCl)₃ carbon tetrachloride and amine are reacted initially and directly.

Example XXI

One mole of P(OCH₂CCl=CHCl)₃ and a mole of each of CH₂=CHCH₂Br, C₆H₅CH₂Cl, C₆H₄(CH₂Cl)₂, ClCH₂COOCH₂CH=CH₂, and C₆Cl₅CH₂Cl are reacted separately by the procedure of Example XX(a), and there are obtained CH₂=CHCH₂P(OCH₂CCl=CHCl)₂, C₆H₅CH₂P(OCH₂CCl=CHCl)₂,
C₆H₄[CH₂P(OCH₂CCl=CHCl)₂]₂,
H₂C=HCOOCCH₂P(OCH₂CCl=CHCl)₂ and Cl₅C₆CH₂P(OCH₂CCl=CHCl)₂, respectively.

Example XXII

Samples of the various phosphorus esters of the previous examples are placed in a microcrucible and the contents ignited by the flame of a microburner. When the flame is withdrawn, burning stops completely.

Example XXIII

A mixture of 50 parts of methyl methacrylate, 5 parts of P(OCH₂CBr=CBr)₃ and 0.5 parts of benzoyl peroxide is polymerized in a sealed container under nitrogen at 80° C. until a hard polymer is obtained, which is self-extinguishing. Similar self-extinguishing polymers are obtained when, instead of P(OCH₂CBr=CBr)₃, the esters of Examples VIII to XII inclusive are used.

Example XXIV

The procedure of Example XXIII is repeated using instead of methyl methacrylate, the monomers styrene, acrylonitrile and vinyl acetate respectively, and self-extinguishing polymers are obtained.

Example XXV

Ten parts of OP(OCH₂CBr=CBr)₃ are added respectively to each of the following, which are approximately 50% solvents and 50% solids, (a) a clear alkyd varnish, (b) a cellulose acetate-butyrate lacquer, (c) a white-pigment oil modified epoxy paint, and (d) a pigmented urethane-type paint; then films are cast from the mixtures and allowed to dry or cure for four days. The resulting films are self-extinguishing.

Example XXVI (a) To 73.85 parts of P(OCH₂CBr=CHBr)₃ in 150 parts of toluene are added 13.6 parts of SO₂Cl₂ and the mixture is heated at 50° C. for one hour until no more SO₂ is liberated. There is obtained an almost quantitative yield of 55.32 parts of $$\underset{\text{ClP}}{\overset{\text{O}}{\|}}-(OCH_2CBr=CHBr)_2$$

in toluene together with the byproduct,

ClCH₂CBr=CHBr.

This solution can be used as prepared for the synthesis of other derivatives, or it may be distilled to recover toluene and ClCH₂CBr=CHBr, leaving as a residue ClP(O)(OCH₂CBr=CHBr)₂.

(b) To 55.32 parts of ClP(O)(OCH₂CBr=CHBr)₂ in 150 parts of toluene under a nitrogen atmosphere, there is slowly added at 20–30° C. a solution containing 100 parts of toluene, 10.6 parts of CH₂=CHCOOCH₂CH₂OH, 0.5 parts of tertiary butyl catechol and 5.9 parts of trimethyl amine, and the mixture stirred for 3 hours. The precipitated amine hydrochloride, (CH₃)₃N·HCl is removed by filtration, and the filtrate containing the product CH₂=CHCOOCH₂CH₂OP(O)(OCH₂CBr=CHBr)₂ is washed with distilled water until the washings are neutral. The toluene solution containing the polymerizable monomer, CH₂=CHCOOCH₂CH₂OP(O)(OCH₂CBr=CHBr)₂ can be used as prepared for the preparation of polymers and copolymers, or grafted to cellulose fibers, or the toluene can be removed by distillation at reduced pressure leaving an almost quantitative yield of the monomer.

(c) A mixture of 25.2 parts of ClCH₂CBr=CHBr and 16.6 parts of triethyl phosphite, P(OC₂H₅)₃, and 0.1 part of benzoyl peroxide are heated at 60–80° C. until no more ethyl chloride is liberated, and there is isolated a quantitative yield of HCBr=CBr—CH₂P(O)(OC₂H₅)₂ which is self-extinguishing when ignited.

(d) When an equivalent weight of

P(OCH₂CH=CH₂)₃,

P(OCH₂CBr=CHBr)₃ or P(OCH₂C≡CBr)₃ is used in reaction (c) above, there is obtained respectively HCBr=CBrCH₂P(O)(OCH₂CH=CH₂)₃,
HCBr=CBrCH₂P(O)(OCH₂CBr=CHBr)₂ and HCBr=CBrCH₂P(O)(OCH₂C≡CBr)₂, which are outstanding flame retardants.

(e) The reaction of

HCBr=CBrCH₂P(O)(OCH₂CH=CH₂)₂ with an equivalent amount of bromine or chlorine by procedures given in the examples hereinabove yields the compounds $HCBr=CBrCH_2P(O)(OCH_2CHBrCH_2Br)_2$ and $HCBr=CBrCH_2P(O)(OCH_2CHClCH_2Cl)_2$ respectively.

(f) A skein of 20 parts of cotton thread is placed in 500 parts of an aqueous solution containing 2.5 parts NaOH, 2.5 parts $CS_2$ and 0.05 parts of sodium dodecylbenzene sulfonate and allowed to stand for 30 minutes. The thread is then removed, washed thoroughly with distilled water, and immersed in 500 parts of a solution containing 0.05 parts of $FeSO_4 \cdot (NH_4)_2SO_4$ and 1.5 parts of tetra-bis-hydroxymethyl phosphonium chloride for 10 minutes. The thread is then washed with distilled water and suspended in 1000 parts of an emulsion containing 8 parts of $$CH_2=CHCOOCH_2CH_2OP(O)(OCH_2CBr=CHBr)_2,$$

0.1 part of sodium dodecylbenzene sulfonate and 1.5 parts of hydrogen peroxide and the mixture heated with agitation under nitrogen for 3 hours. The thread is then removed, washed with water and dried. There is obtained 28 parts of grafted thread, which when suspended and its end ignited, is self-extinguishing when the source of the flame is withdrawn.

While certain features of the invention have been described in detail with respect to the various embodiments thereof, it will, of course, be apparent that other modifications may be made within the spirt and scope of this invention, and it is not intended to limit the invention to the exact details shown above except insofar as they are defined in the following claim:

The invention claimed is:

1. A new compound having the formula

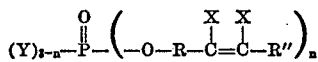

wherein $n$ is an integer having a value of at least 1 and no more than 3,

R is a divalent alkylene hydrocarbon having at least 1 and no more than 10 carbon atoms, X is a halogen selected from the class consisting of chlorine and bromine, R" is a radical selected from the class of hydrogen, cyclohexyl, phenyl and an alkyl radical having 1–20 carbon atoms; and Y is a radical selected from the class of X, OR" and $NR_2"$.

2. The compound of claim 1 in which X is chlorine.
3. The compound of claim 1 in which X is bromine.
4. The compound of claim 1 in which R" is hydrogen.
5. The compound of claim 1 in which $n$ is two and Y is one.
6. The compound of claim 1 in which $n$ is one and Y is two.
7. The compound of claim 1 in which $n$ is three.
8. The compound of claim 1 in which the formula is $$O=P(OCH_2CX=CXR")_3$$

9. The compound of claim 1 in which R is

10. The compound of claim 1 in which R is $-CH_2-$.
11. The compound of claim 1 having the formula

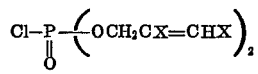

12. The compound of claim 11 having the formula

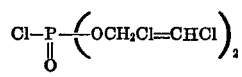

13. The compound of claim 11 having the formula

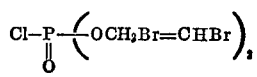

References Cited
UNITED STATES PATENTS 2,394,829    2/1946    Whitehill et al. ...... 260—956 X LEWIS GOTTS, Primary Examiner A. H. SUTTO, Assistant Examiner U.S. Cl. X.R.

44—Dig. 4; 71—86; 117—136; 260—2 P, 30.6 R, 45.7 P, 633, 640, 763, 967, 973, 974, 982, 986

UNITED STATES PATENT OFFICE
CERTIFICATE OF CORRECTION

Patent No. 3,780,144                 Dated  Dec. 18, 1973

Inventor(s)  Gaetano F. D'Alelio

It is certified that error appears in the above-identified patent and that said Letters Patent are hereby corrected as shown below:

Col. 1, line 32, correct "or" to read ---of---;
Col. 2, line 32, correct the formula $OP(CH_2)CHXCH_2X)_3$ to read $OP(CH_2CHXCH_2X)_3$;
Col. 2, line 64, correct the first formula $HC\equiv C=CH_2OH$ to read $HC\equiv C-CH_2OH$;
Col. 2, line 71, correct the formula $$\underset{HC=C-CHOH}{\overset{Br\;Br\;CH_3}{|\;\;|\;\;|}}$$

to read $$\underset{HC=C\;\;CHOH}{\overset{Br\;Br\;CH_3}{|\;\;\;|\;\;\;|}}$$

Col. 3, line 19, correct the formulas $CH_3C=CCH_2OH$ and $P(OCH_2C=CCH_3)_3$ to read respectively $CH_3C\equiv CCH_2OH$ and $P(OCH_2C\equiv CCH_3)_2$;
Col. 3, line 20, correct the formula $P(OCH_2CBr=CBr)_3$ to read $P(OCH_2CBr=CBrCH_3)_3$;
Col. 4, line 61, correct the formula $ClCH-CClCH_2OH$ to read $ClCH=CClCH_2OH$;
Col. 4, line 71, correct the formula $BrCH-CBrCH_2OH$ to read $BrCH=CBrCH_2OH$;
Col. 5, line 2, correct NaCCl to read NaOCl;
Col. 5, line 5, correct 4-chloro-2-methyl-3-butyl-2-ol to read 4-chloro-2-methyl-3-butynl-2-ol;
Col. 5, line 14, correct 2-methyl-3-butyl-2-ol to read 2-methyl-3-butynl-2-ol;
Col. 14, line 19 (Claim 10), correct $-CH_2$ to read $-CH_2-$.

Signed and Sealed this twentieth Day of April 1976

[SEAL]

Attest:

RUTH C. MASON
Attesting Officer

C. MARSHALL DANN
Commissioner of Patents and Trademarks